US012675216B2

(12) United States Patent
Ammari et al.

(10) Patent No.: US 12,675,216 B2
(45) Date of Patent: Jul. 7, 2026

(54) SYSTEMS AND METHODS FOR TIER MANAGEMENT IN MEMORY-TIERING ENVIRONMENTS

(71) Applicant: Samsung Electronics Co., Ltd., Suwon-si (KR)

(72) Inventors: Ramzi Ammari, Santa Clara, CA (US); Mukesh Garg, Stanford, CA (US); Praveen Krishnamoorthy, Fremont, CA (US); Changho Choi, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 52 days.

(21) Appl. No.: 18/055,760

(22) Filed: Nov. 15, 2022

(65) Prior Publication Data

US 2024/0094905 A1     Mar. 21, 2024

Related U.S. Application Data

(60) Provisional application No. 63/408,783, filed on Sep. 21, 2022.

(51) Int. Cl.
*G06F 3/06* (2006.01)

(52) U.S. Cl.
CPC .......... *G06F 3/0605* (2013.01); *G06F 3/0649* (2013.01); *G06F 3/0683* (2013.01)

(58) Field of Classification Search
CPC ..... G06F 3/0605; G06F 3/0649; G06F 3/0683
USPC ........................................................ 711/154
See application file for complete search history.

(56) References Cited

U.S. PATENT DOCUMENTS

| | | | |
|---|---|---|---|
| 6,128,713 A | 10/2000 | Eisler et al. | |
| 6,910,106 B2 | 6/2005 | Sechrest et al. | |
| 9,740,631 B2 | 8/2017 | Shiu | |
| 11,100,091 B2 | 8/2021 | Padmanabhan et al. | |
| 11,106,600 B2 | 8/2021 | Loh et al. | |
| 11,360,901 B2 | 6/2022 | Eom et al. | |
| 2010/0312955 A1 | 12/2010 | Hwang et al. | |
| 2011/0010514 A1* | 1/2011 | Benhase ................ | G06F 3/061 711/170 |

(Continued)

FOREIGN PATENT DOCUMENTS

| | | |
|---|---|---|
| CN | 105975817 A | 9/2016 |
| CN | 107408132 A | 11/2017 |

(Continued)

OTHER PUBLICATIONS

Panwar, Ashish et al., "Fast Local Page-Tables for Virtualized NUMA Servers with vMitosis," ASPLOS '21, Apr. 2021, pp. 194-210.

(Continued)

*Primary Examiner* — Gautam Sain
(74) *Attorney, Agent, or Firm* — Womble Bond Dickinson (US) LLP

(57) ABSTRACT

Systems and methods for tier management in memory-tiering environments. In some embodiments, a method includes accessing, by a first process, a first page of the first process in a first tier of a non-uniform memory access memory; and locking, by a first thread, the first page against demotion. The first thread may be a tier-management thread of the first process, and the locking of the first page may be based on a service level of the first process.

20 Claims, 9 Drawing Sheets

(56)             References Cited

U.S. PATENT DOCUMENTS

| | | | |
|---|---|---|---|
| 2013/0111129 A1 | 5/2013 | Maki et al. | |
| 2013/0290598 A1* | 10/2013 | Fiske .................... | G06F 3/0625 |
| | | | 711/E12.008 |
| 2014/0115213 A1 | 4/2014 | Jacobs et al. | |
| 2014/0115215 A1* | 4/2014 | Jacobs .................... | G06F 12/00 |
| | | | 710/200 |
| 2016/0188490 A1* | 6/2016 | Samih .................. | G11C 7/1072 |
| | | | 711/135 |
| 2020/0264786 A1* | 8/2020 | Mukherjee ............ | G06F 3/0611 |
| 2020/0371700 A1* | 11/2020 | Stabrawa .............. | G06F 3/0631 |
| 2020/0382590 A1 | 12/2020 | Yudanov et al. | |
| 2021/0185368 A1 | 6/2021 | Hao et al. | |
| 2022/0011941 A1 | 1/2022 | Alverti et al. | |
| 2022/0012184 A1 | 1/2022 | Arelakis et al. | |
| 2022/0214825 A1 | 7/2022 | Ganguly et al. | |

FOREIGN PATENT DOCUMENTS

| | | |
|---|---|---|
| CN | 111177024 A | 5/2020 |
| JP | 2016-1507 A | 1/2016 |

OTHER PUBLICATIONS

EPO Extended European Search Report dated Jan. 26, 2024, issued in Corresponding European Patent Application No. 23198749.6, 8 pages.
Chinese Notice of Allowance corresponding to CN Application No. 202311208096.6, dated Jan. 14, 2026 (5 pages).

* cited by examiner

Accessing, by a first process, a first page of the first process in a first tier of a non-uniform memory access memory
505

Locking, by a first thread, the first page against demotion
510

SYSTEMS AND METHODS FOR TIER MANAGEMENT IN MEMORY-TIERING ENVIRONMENTS

CROSS-REFERENCE TO RELATED APPLICATION(S)

The present application claims priority to and the benefit of U.S. Provisional Application No. 63/408,783, filed Sep. 21, 2022, entitled "FAIRNESS, ISOLATION AND PRICE PER CAPACITY GUARANTEE FOR MULTI-TENANTS IN MEMORY-TIERING ENVIRONMENT", the entire content of which is incorporated herein by reference.

FIELD

One or more aspects of embodiments according to the present disclosure relate to computing systems, and more particularly to systems and methods for tier management in memory-tiering environments.

BACKGROUND

In a computing system with non-uniform memory access (NUMA) memory, several tiers of memory may be available, with different tiers exhibiting different performance characteristics. For example, a first tier of non-uniform memory access memory may exhibit higher throughput or lower latency than a second tier of non-uniform memory access memory.

It is with respect to this general technical environment that aspects of the present disclosure are related.

SUMMARY

According to an embodiment of the present disclosure, there is provided a method, including: accessing, by a first process, a first page of the first process in a first tier of a non-uniform memory access memory; and locking, by a first thread, the first page against demotion, the first thread being a tier-management thread of the first process, and the locking of the first page being based on a service level of the first process.

In some embodiments, the locking of the first page is further based on a first ranking of pages of the first process, the first ranking of pages including the first page.

In some embodiments, the method includes locking a number of pages of the first process including the first page, wherein the number of pages is based on the service level of the first process.

In some embodiments, the number of pages is further based on a total number of pages of the first process.

In some embodiments, the method further includes: accessing, by the first process, a second page of the first process in the first tier of the non-uniform memory access memory; and locking, by the first thread, the second page against demotion.

In some embodiments, the method further includes unlocking the first page, wherein the unlocking of the first page is based on the service level of the first process.

In some embodiments, the unlocking of the first page is further based on a second ranking of pages of the first process, the second ranking of pages including the first page and the second page.

In some embodiments, in the second ranking, the second page is ranked higher than the first page.

In some embodiments, the first thread is dedicated to the first process.

According to an embodiment of the present disclosure, there is provided a system, including: a processing circuit; and memory, operatively connected to the processing circuit and storing instructions that, when executed by the processing circuit, cause the system to perform a method, the method including: accessing, by a first process, a first page of the first process in a first tier of a non-uniform memory access memory; and locking, by a first thread, the first page against demotion, the first thread being a tier-management thread of the first process, and the locking of the first page being based on a service level of the first process.

In some embodiments, the locking of the first page is further based on a first ranking of pages of the first process, the first ranking of pages including the first page.

In some embodiments, the method includes locking a number of pages of the first process including the first page, wherein the number of pages is based on the service level of the first process.

In some embodiments, the number of pages is further based on a total number of pages of the first process.

In some embodiments, the method further includes: accessing, by the first process, a second page of the first process in the first tier of the non-uniform memory access memory; and locking, by the first thread, the second page against demotion.

In some embodiments, the method further includes unlocking the first page, wherein the unlocking of the first page is based on the service level of the first process.

In some embodiments, the unlocking of the first page is further based on a second ranking of pages of the first process, the second ranking of pages including the first page and the second page.

In some embodiments, in the second ranking, the second page is ranked higher than the first page.

In some embodiments, the first thread is dedicated to the first process.

According to an embodiment of the present disclosure, there is provided a system, including: means for processing; and memory, operatively connected to the means for processing and storing instructions that, when executed by the means for processing, cause the system to perform a method, the method including: accessing, by a first process, a first page of the first process in a first tier of a non-uniform memory access memory; and locking, by a first thread, the first page against demotion, the first thread being a tier-management thread of the first process, and the locking of the first page being based on a service level of the first process.

In some embodiments, the locking of the first page is further based on a first ranking of pages of the first process, the first ranking of pages including the first page.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1:
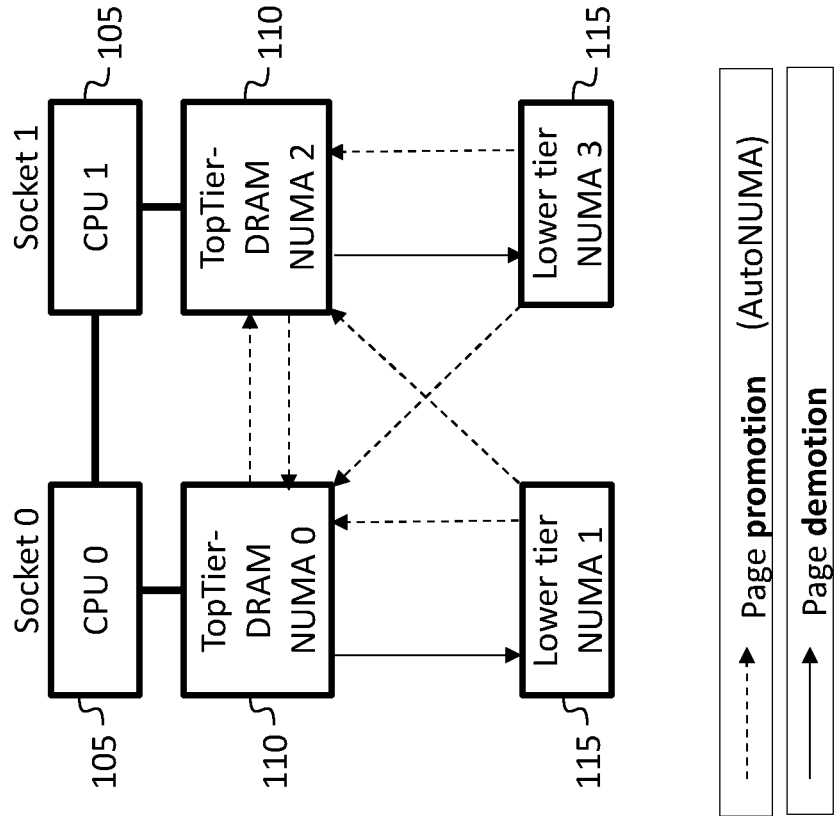
FIG. 1 is a block diagram of a portion of a computing system, according to an embodiment of the present disclosure.

The detailed description set forth below in connection with the appended drawings is intended as a description of exemplary embodiments of systems and methods for tier management in memory-tiering environments provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Computing systems with non-uniform memory access memory may include several central processing units (CPUs) and multiple tiers of non-uniform memory access memory connected to the central processing units. The tiers may have different performance characteristics, with higher tiers performing better than lower tiers. For example, a first tier (which may be the top tier) may have certain latency and throughput characteristics, a second tier (the tier immediately below the first tier) may have higher latency or lower throughput than the first tier, and a third tier (the tier immediately below the second tier) may have higher latency or lower throughput than the second tier. Each of the central processing units may be capable of running, and configured to run, several processes concurrently. For example, each such process may be a respective application being run by a user, or it may be an application running on a server, e.g., for retrieving or processing data, stored on the server, and sending the data or the results of the data processing to a client.

Each tier of the non-uniform memory access memory may be arranged as a set of pages. Each process may be allocated, by an operating system running on the central processing unit, a certain number of pages (e.g., zero or more pages) in each tier of non-uniform memory access memory. Generally, when a page is used frequently, the operating system (e.g., the kernel) may place it in a higher tier (e.g., in the first tier) and if a page is used rarely, the operating system may place it in a lower tier (e.g., in the third tier). The operating system (e.g., the kernel of the operating system) may periodically or continuously re-evaluate the placement of pages in tiers, and promote a page (e.g., move the page to a higher tier) if it is being used relatively frequently (e.g., more frequently than the other pages in the tier that it is in) or demote a page (e.g., move the page to a lower tier) if it is being used relatively infrequently (e.g., less frequently than the other pages in the tier that it is in). The function of automatically promoting pages by the operating system (e.g., by the kernel) based on usage patterns may be referred to as automatic non-uniform memory access balancing, or as "AutoNUMA".

To assess frequency of access, a kernel task may routinely sample a subset of each process's allocated memory on each non-uniform memory access node, and clear the present bit on their flags. When a CPU accesses a page a minor page-fault is generated (which may be referred to as a NUMA hint fault). In the page-fault it may record which CPU is trying to access the page. Pages that are accessed from a remote CPU may migrated to that CPU's local memory node.

The promotion of some pages may be linked to the demotion of other pages. For example, if a tier (e.g., the first tier) is full, then it may be necessary to demote at least one page from the first tier, to make room in the first tier, before another page can be promoted to the first tier. As such, in some circumstances the memory performance that the computing system provides to one process may be affected by another process. For example, if a first process accesses memory frequently, then the pages of the first process may be promoted, potentially resulting in the demotion of pages of a second process, if the second process accesses memory relatively infrequently.

The ability of one process to affect the performance of another process in this manner may be an obstacle to guaranteeing performance for any given process. For example, an operator managing a set of servers may wish to offer customers the opportunity to run processes on the servers (e.g., in exchange for payment); such customers (or "tenants") may expect that a certain service level is guaranteed (e.g., that a certain number of pages in the first tier will be allocated to the processes, or that a certain fraction of pages of a process (e.g., half of the pages of a process) will remain in the first tier); such guarantees may be difficult to provide if some processes, which are active in accessing memory, are able to cause the pages of other processes, which are less active in accessing memory, to be demoted.

As such, in some embodiments, a process running on a computing system may have, associated, with it, a tier-management thread running on the computing system. The tier-management thread may monitor memory accesses performed by the process, and lock pages of the process against demotion, so as to maintain a certain service level for the process. The service level may require, for example, that (i) a certain number of pages of the process be kept in the first tier, or that (ii) a certain fraction of the pages of the process be kept in the first tier. The tier-management thread may, for example, lock, against demotion, a number of the most recently accessed pages of the process, the number being selected to ensure that the service level requirement of the process is met. As pages of the process are promoted into the first tier, and as the access patterns of the process change, the tier-management thread may unlock some pages and lock other pages, so that the most recently used pages of the process remain locked against demotion. As used herein, a "service level" is a set of one or more requirements affecting the performance of a process running in a computing system. Such requirements may include, for example, a requirement that (i) a certain number of pages of the process be kept in the first tier, or that (ii) a certain fraction of the pages of the process be kept in the first tier.

In this manner, some embodiments may (i) create fairness between processes where each process is guaranteed a percentage of the first tier, (ii) create performance isolation between different tenants and processes where the activity of one process does not result in the promotion of its own pages and the demotion of pages of other processes, and (iii) guarantee no memory starvation and performance degradation, as might otherwise occur, for example, if all the pages of one process were demoted to a lower, slower tier.

FIG. 1 shows a computing system with two central processing units 105 and four non-uniform memory access nodes, two of which are top tier (e.g., first tier) non-uniform memory access nodes 110 and two of which are lower tier (e.g., second tier) non-uniform memory access nodes 115. As indicated by the legend of FIG. 1, dashed lines show the movement a page may make from one non-uniform memory access node to another non-uniform memory access node when the page is promoted, and solid lines show the movement a page may make from one non-uniform memory access node to another non-uniform memory access node when the page is demoted.

Figure 2A:
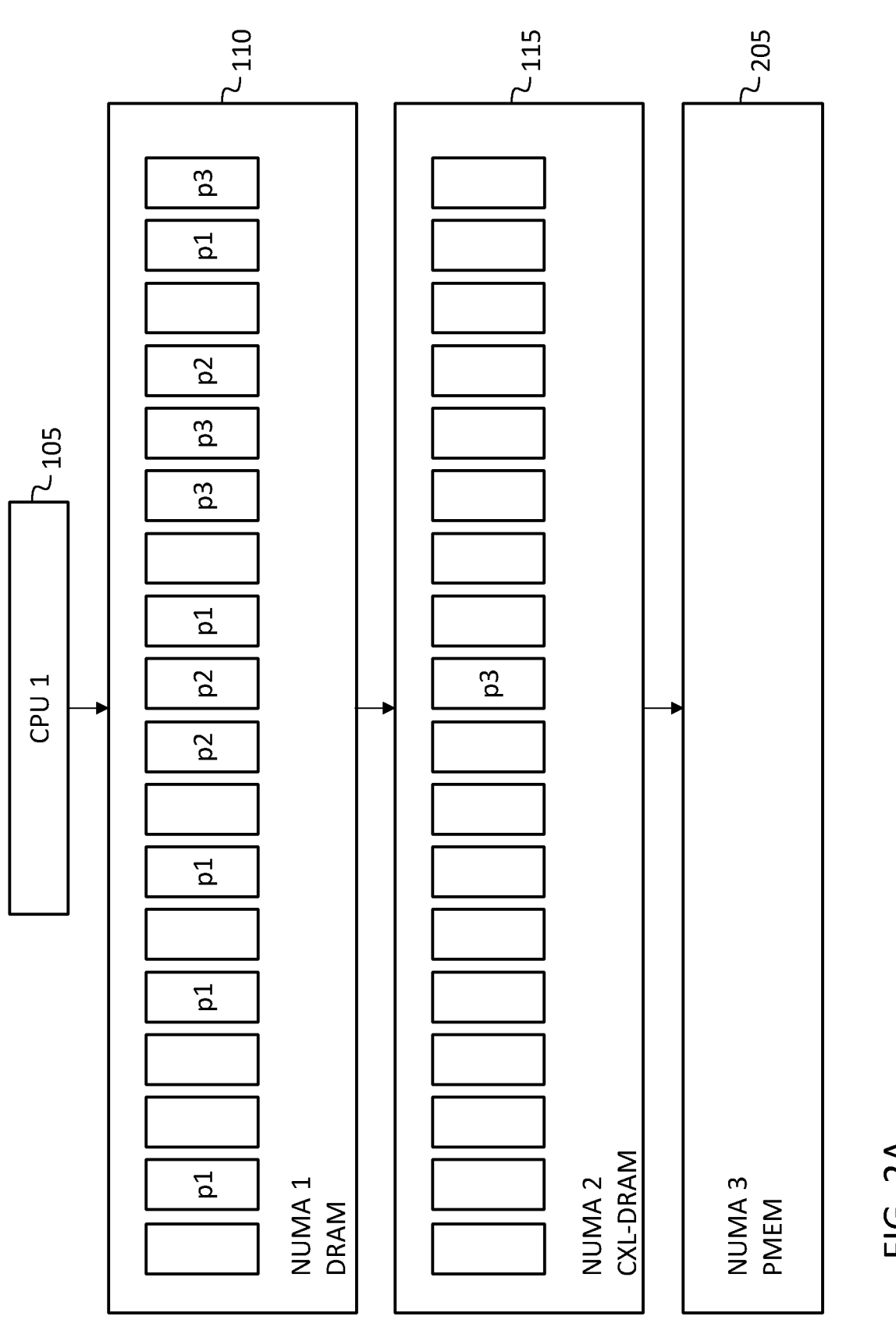
FIG. 2A is an illustration of a first example of a memory configuration at a first point in time, according to an embodiment of the present disclosure.
Figure 2B:
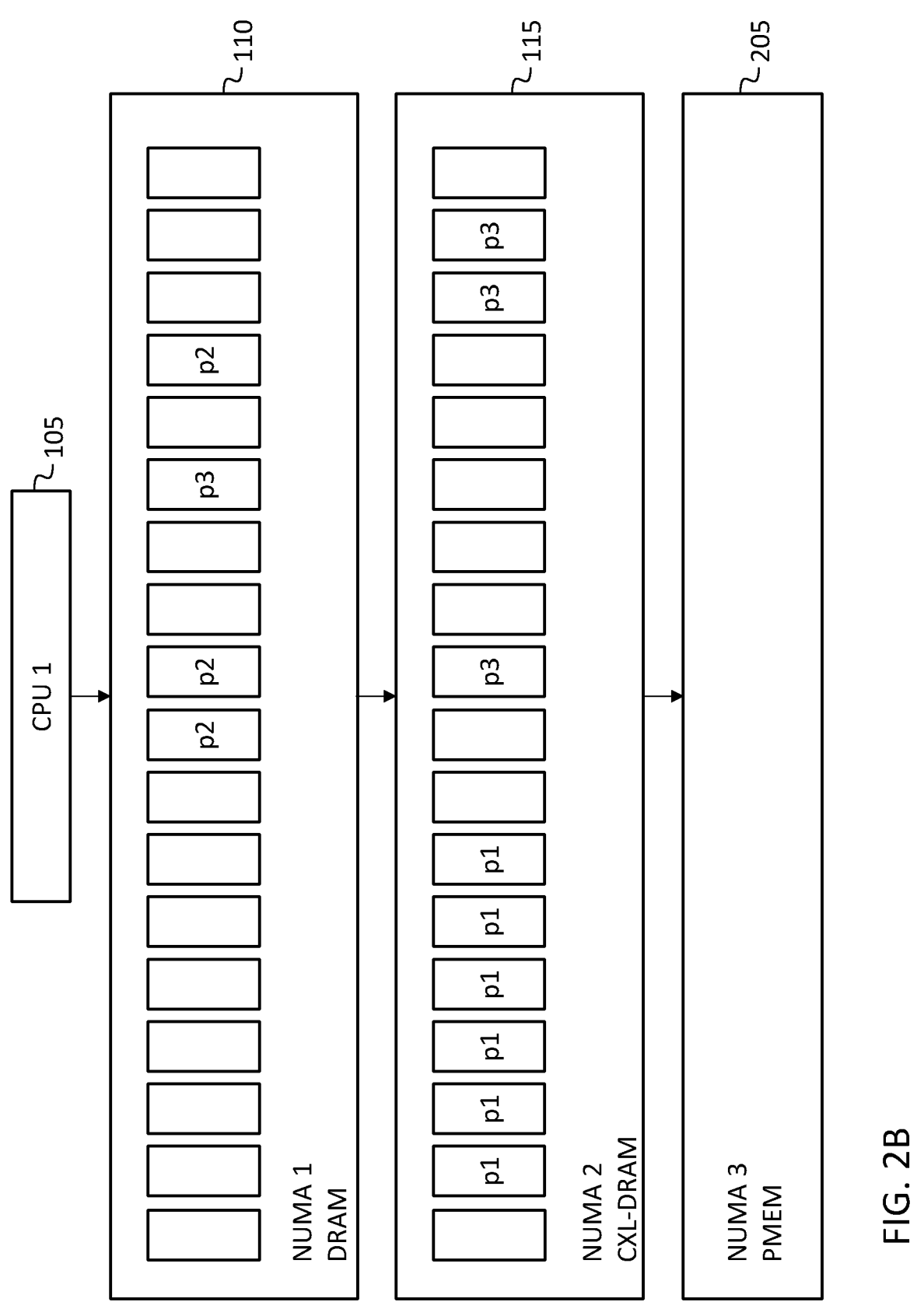
FIG. 2B is an illustration of a first example of a memory configuration at a second point in time, according to an embodiment of the present disclosure.

FIGS. 2A and 2B show movement of pages, as some pages are promoted and other pages are demoted. In FIGS. 2A and 2B, three processes (a first process, a second process, and a third process) each have pages in one or more of the non-uniform memory access nodes, including a first tier node 110, a second tier node 115, and a third tier node 205, as shown. The first tier non-uniform memory access node 110 is implemented, in this example, as dynamic random access memory (DRAM) directly connected to the CPU 105 (via an address bus and a data bus). The second tier non-uniform memory access node 115 is implemented, in this example, as dynamic random access memory (DRAM) connected to the CPU 105 through a Compute Express Link (CXL) connection (with, e.g., a CXL root complex connected to the CPU 105, and one or more CXL lanes (e.g., Peripheral Component Interconnect Express (PCIe) lanes) connecting the CXL root complex to a CXL endpoint which may include a plurality of DRAM chips or modules). The third tier non-uniform memory access node 205 is implemented, in this example, as persistent storage (PMEM) (e.g., flash memory, which may be part of a solid state drive).

In the example of FIGS. 2A and 2B, at a first point in time, all of the pages of process 1 (labeled "p1") are in the first tier non-uniform memory access node. The first tier also stores several pages for a second process (labeled "p2") and several pages for a third process (labeled "p3"). Between the first point in time and a second point in time, as a result of the first process and the third process performing fewer memory accesses than the second process within the pages that are illustrated, all of the pages of the first process and all but one of the pages of the third process are demoted to the second tier non-uniform memory access node, resulting, at the second point in time, in the configuration shown in FIG. 2B. Depending on the service level expected for the first process, such demotion of its pages to the second tier non-uniform memory access node may result in the service level not being met.

As mentioned above, such a result may be avoided by the use of tier-management threads. When a process starts, a tier-management thread may be started at the same time. Each tier-management thread may be dedicated to a single process, or, in some embodiments, a tier-management thread may perform tier management for several processes. In some embodiments, a tier-management thread is started for each process as it starts; in some embodiments, some processes may run with an associated tier-management thread and some processes may run without an associated tier-management thread. Various mechanisms may be employed to determine whether a tier-management thread is started when a process starts. For example, a process may, when it starts, call an operating system function that starts a tier-management thread. As another example, a policy file for the process may contain a flag indicating whether a tier-management thread is to be run along with the process; when the process starts, the operating system may read the flag and start a tier-management thread if the flag indicates that such a thread is to be started. As used herein, a "tier-management thread" of a process is a thread that is configured to manage the locations, in one or more tiers of non-uniform memory access memory, of pages of the process.

In operation, the tier-management thread may create a least recently used (LRU) list for the process and shuffle the pages with the list based on the hotness or coldness of each page. The least recently used list may be a list of the pages the process has in the non-uniform memory access memory, ranked according to how long ago a page was last accessed by the process. The most recently accessed page may be at the bottom of the least recently used list, and the least recently accessed page may be at the top of the least recently used list. The tier-management thread may then lock (e.g., using an mlock( ) operating system call) certain pages against demotion, e.g., lock the pages so as to prevent their demotion by automatic non-uniform memory access balancing. The locking may be performed based on a service level of the process. For example, if a requirement of the service level is that a certain number of most recently pages be kept in the first tier, then the tier-management thread may ensure that at all times this number of the most recently used pages of the process (e.g., this number of pages at the bottom of the least recently used list) are locked. The tier-management thread may also unlock any page that has moved up in the least recently used list (e.g., as a result of recently having been accessed only infrequently) so that it is no longer in the set of pages, at the bottom of the least recently used list, that should not be allowed to be demoted. In some embodiments, the tier-management thread may also promote, or force the promotion of, some pages of a process, if, e.g., the process has too few pages in the first tier.

Figure 3A:
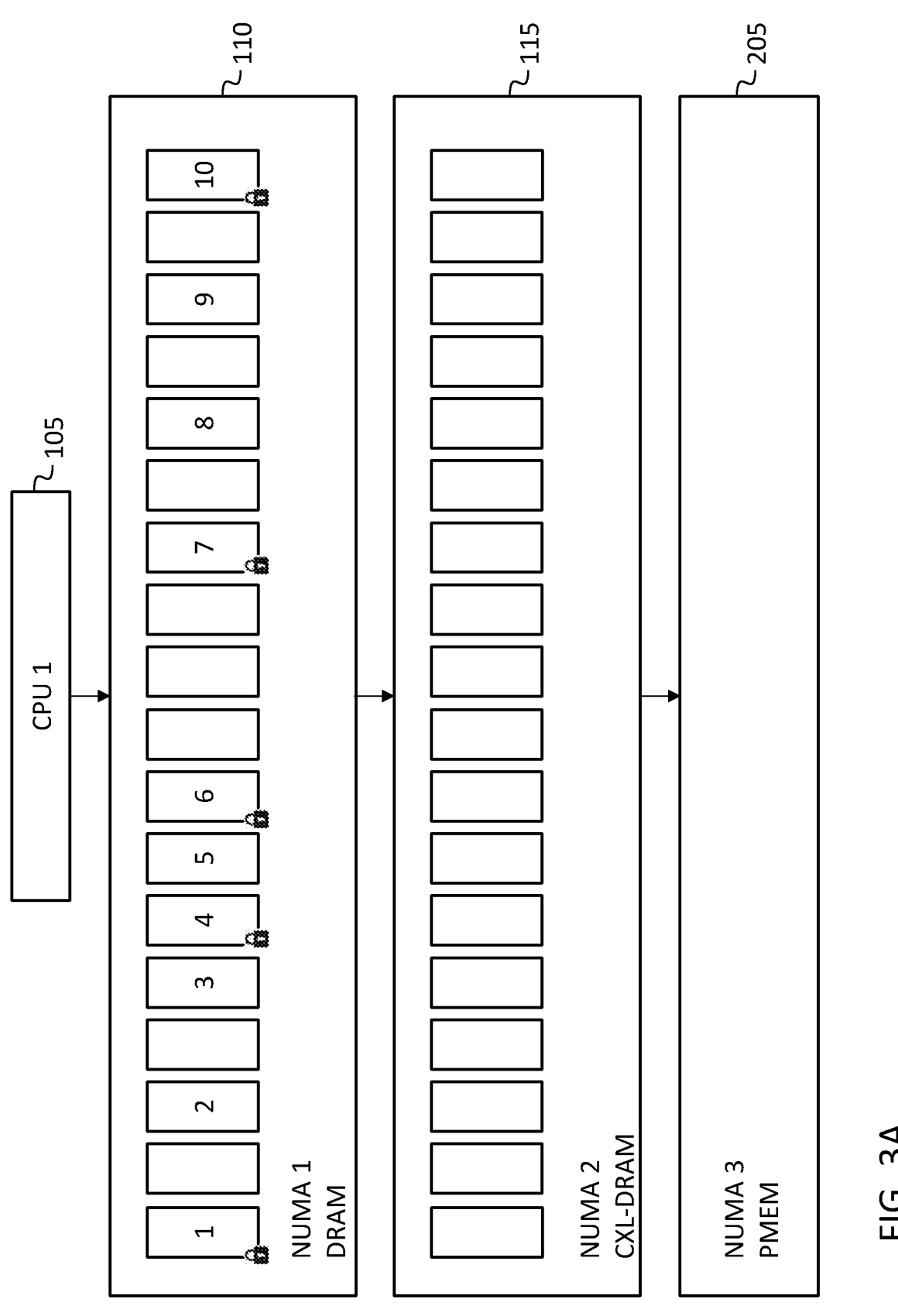
FIG. 3A is an illustration of a second example of a memory configuration at a first point in time, according to an embodiment of the present disclosure.
Figure 3B:
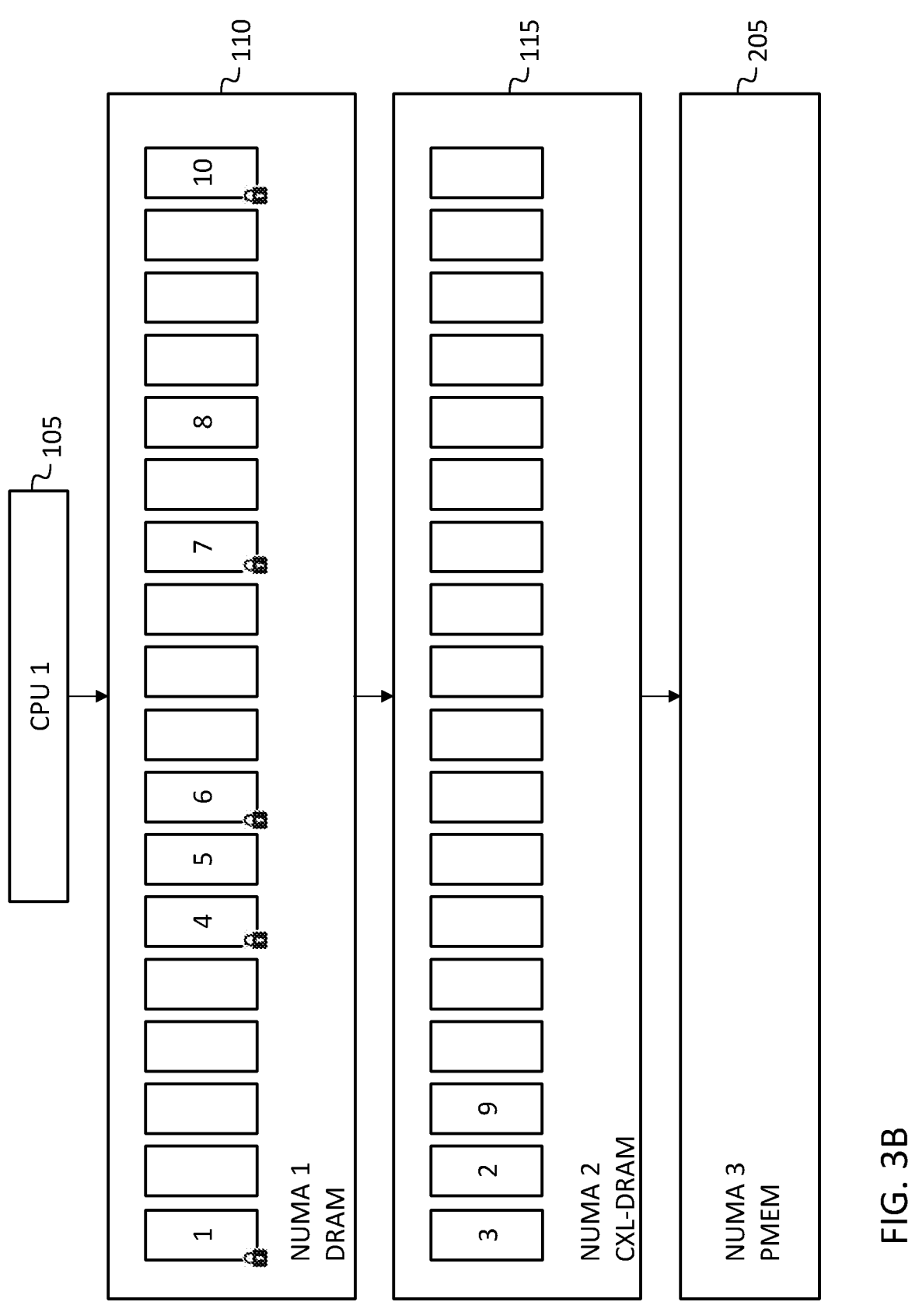
FIG. 3B is an illustration of a second example of a memory configuration at a second point in time, according to an embodiment of the present disclosure.
Figure 3C:
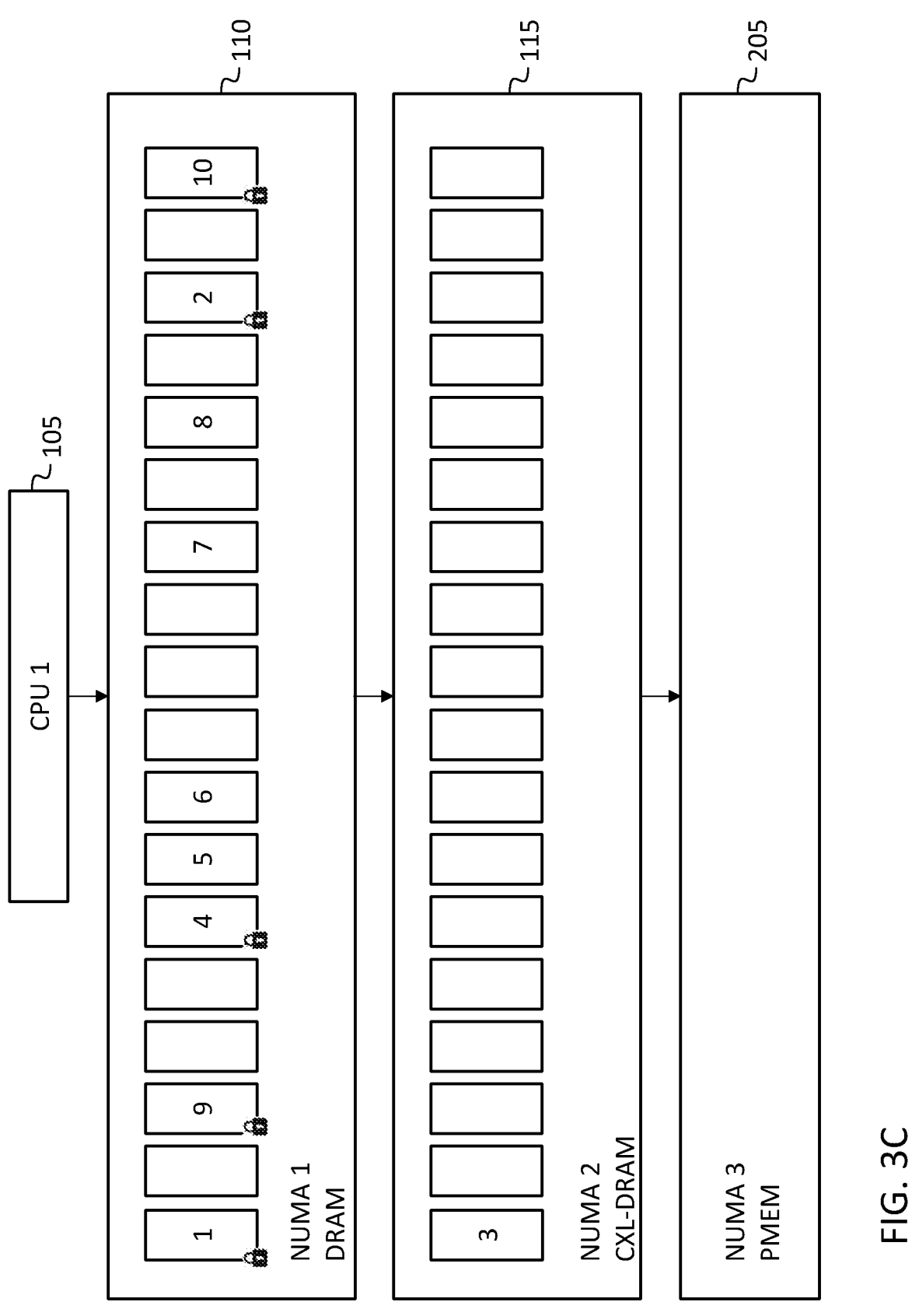
FIG. 3C is an illustration of a second example of a memory configuration at a third point in time, according to an embodiment of the present disclosure.
Figure 3D:
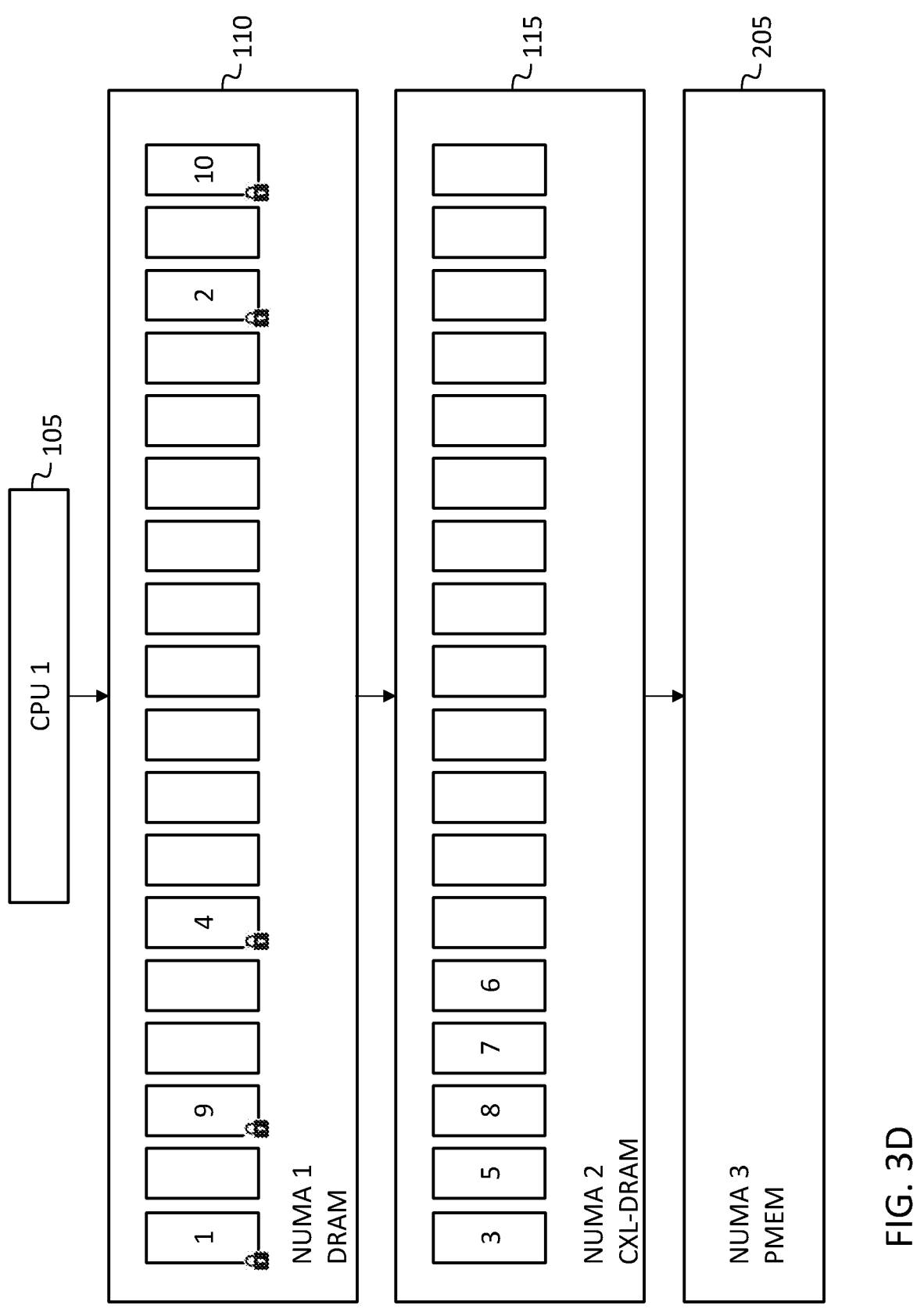
FIG. 3D is an illustration of a second example of a memory configuration at a fourth point in time, according to an embodiment of the present disclosure.
Figure 4:
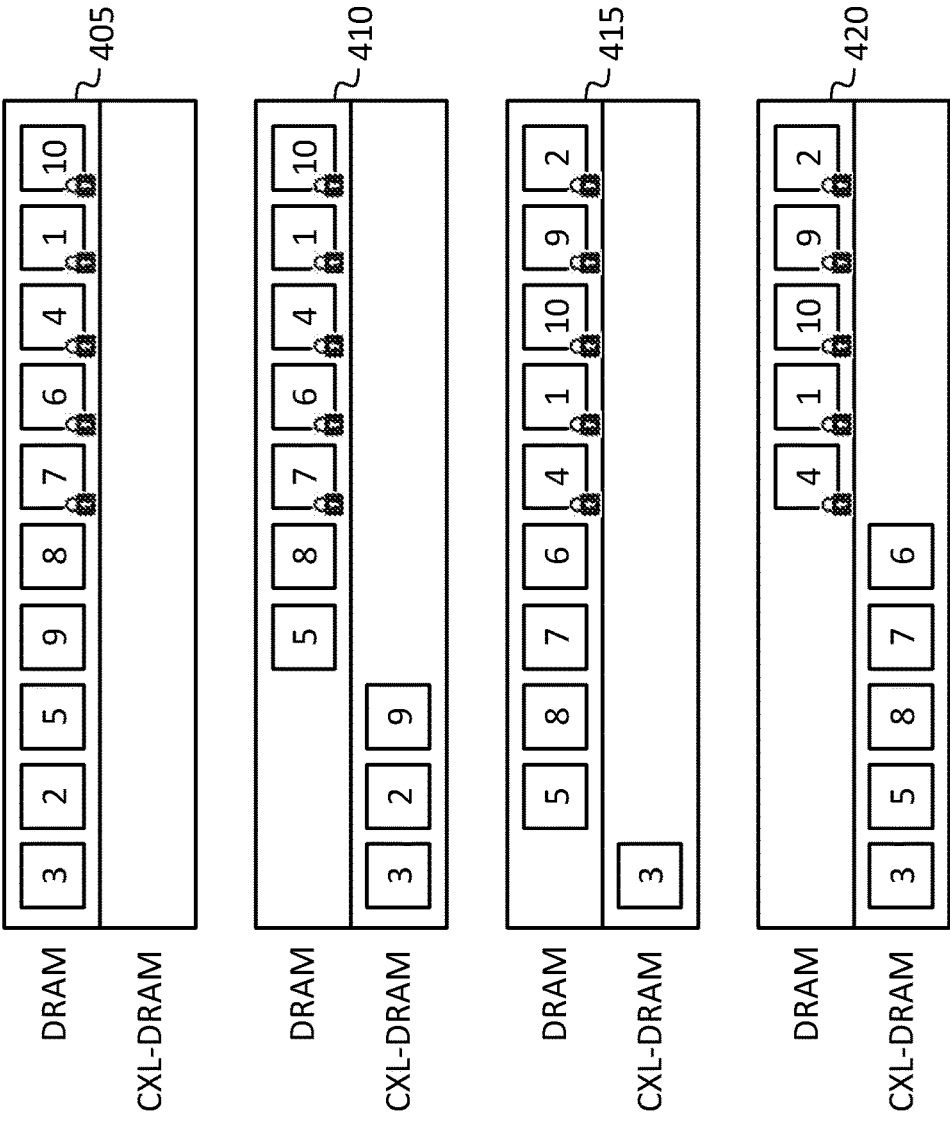
FIG. 4 is an illustration of a least recently used list at four points in time, according to an embodiment of the present disclosure.

FIGS. 3A-4 show an example of page promotions and demotions, and of page locking, in some embodiments. FIGS. 3A-3D show page locations in the first and second tiers of non-uniform memory access memory at four points in time, and FIG. 4 shows the least recently used list for the four points in time. In the example of FIGS. 3A-4, the service level of the process requires that at least half of the pages of the process be stored in the first tier. For simplicity, the process is shown as having 10 pages; in other circumstances a process may have a different number of pages. At a first point in time, all of the pages, numbered 1 through 10, are in the first tier as shown in FIG. 3A. Pages 10, 1, 4, 6, and 7 are the five last pages in the least recently used list, as shown in the first list 405 of FIG. 4, and have been locked against demotion by the tier-management thread (as indicated by padlock symbols in the drawings).

At a second point in time, the operating system (e.g., the automatic non-uniform memory access balancing function of the kernel) has demoted pages 3, 2, and 9, which were not locked, not being among the five most recently used pages, as shown in FIG. 3B and the second list 410 of FIG. 4. At this point in time, the service level continues to be met, because there are seven pages of the process in the first tier.

At a third point in time, pages 2 and 9 are promoted and are at the bottom of the least recently used list, and the tier-management thread locks pages 2 and 9 against demotion and unlocks pages 6 and 7, as shown in FIG. 3C and the third list 415 of FIG. 4. At a fourth point in time, the operating system (e.g., the automatic non-uniform memory access balancing function of the kernel) has demoted pages 5, 6, 7, and 8, which were no longer locked, as shown in FIG. 3D and the fourth list 420 of FIG. 4. Throughout the sequence illustrated in FIGS. 3A-4, the service level continues to be met, because at all times the five pages that are at the bottom of the least recently used list are in the first tier.

Figure 5:
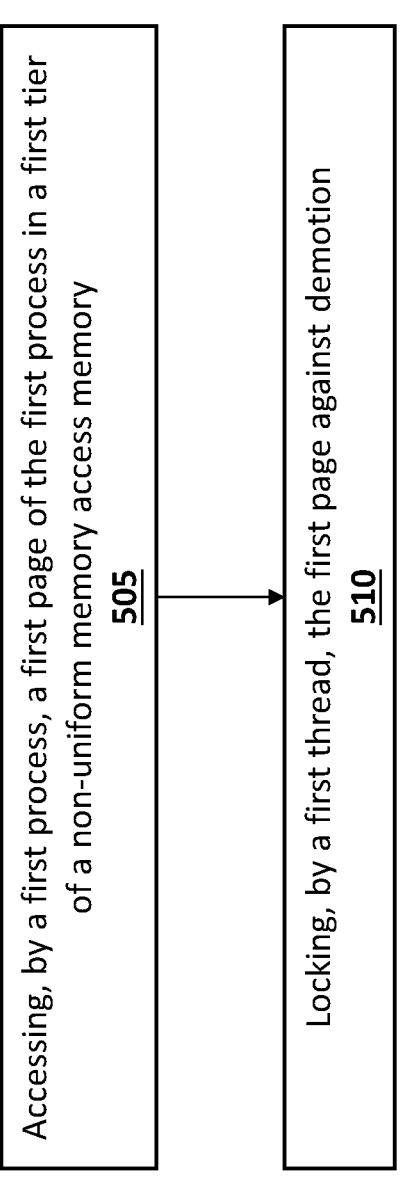
FIG. 5 is a flow chart of a method, according to an embodiment of the present disclosure.

FIG. 5 is a flow chart of a method, in some embodiments. The method includes accessing, at 505, by a first process, a first page of the first process in a first tier of a non-uniform memory access memory; and locking, at 510, by a first thread, the first page against demotion. The first thread may be a tier-management thread of the first process, and the locking of the first page may be based on a service level of the first process.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X-Y and the second quantity is at most X+Y. As used herein, when a second number is "within Y %" of a first number, it means that the second number is at least $(1-Y/100)$ times the first number and the second number is at most $(1+Y/100)$ times the first number. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1-35/100) times 10) and the recited maximum value of 13.5 (i.e., (1+$^{35}$/$_{100}$) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Some embodiments include features listed in the following numbered statements.

1. A method, comprising:
accessing, by a first process, a first page of the first process in a first tier of a non-uniform memory access memory; and
locking, by a first thread, the first page against demotion, the first thread being a tier-management thread of the first process, and
the locking of the first page being based on a service level of the first process.

2. The method of statement 1, wherein the locking of the first page is further based on a first ranking of pages of the first process, the first ranking of pages including the first page.

3. The method of statement 1 or statement 2, comprising locking a number of pages of the first process including the first page, wherein the number of pages is based on the service level of the first process.

4. The method of statement 3, wherein the number of pages is further based on a total number of pages of the first process.

5. The method of any one of the preceding statements, further comprising:
accessing, by the first process, a second page of the first process in the first tier of the non-uniform memory access memory; and
locking, by the first thread, the second page against demotion.

6. The method of statement 5, further comprising unlocking the first page, wherein the unlocking of the first page is based on the service level of the first process.

7. The method of statement 6, wherein the unlocking of the first page is further based on a second ranking of pages of the first process, the second ranking of pages including the first page and the second page.

8. The method of statement 7, wherein, in the second ranking, the second page is ranked higher than the first page.

9. The method of any one of the preceding statements, wherein the first thread is dedicated to the first process.

10. A system, comprising:
a processing circuit; and
memory, operatively connected to the processing circuit and storing instructions that, when executed by the processing circuit, cause the system to perform a method, the method comprising:
accessing, by a first process, a first page of the first process in a first tier of a non-uniform memory access memory; and
locking, by a first thread, the first page against demotion, the first thread being a tier-management thread of the first process, and
the locking of the first page being based on a service level of the first process.

11. The system of statement 10, wherein the locking of the first page is further based on a first ranking of pages of the first process, the first ranking of pages including the first page.

12. The system of statement 10 or statement 11, wherein the method comprises locking a number of pages of the first process including the first page, wherein the number of pages is based on the service level of the first process.

13. The system of any one of the preceding statements, wherein the number of pages is further based on a total number of pages of the first process.

14. The system of any one of the preceding statements, wherein the method further comprises:
accessing, by the first process, a second page of the first process in the first tier of the non-uniform memory access memory; and
locking, by the first thread, the second page against demotion.

15. The system of statement 14, wherein the method further comprises unlocking the first page, wherein the unlocking of the first page is based on the service level of the first process.

16. The system of statement 15, wherein the unlocking of the first page is further based on a second ranking of pages of the first process, the second ranking of pages including the first page and the second page.

17. The system of statement 16, wherein, in the second ranking, the second page is ranked higher than the first page.

18. The system of any one of the preceding statements, wherein the first thread is dedicated to the first process.

19. A system, comprising:
means for processing; and
memory, operatively connected to the means for processing and storing instructions that, when executed by the means for processing, cause the system to perform a method, the method comprising:
accessing, by a first process, a first page of the first process in a first tier of a non-uniform memory access memory; and
locking, by a first thread, the first page against demotion, the first thread being a tier-management thread of the first process, and
the locking of the first page being based on a service level of the first process.

20. The system of statement 19, wherein the locking of the first page is further based on a first ranking of pages of the first process, the first ranking of pages including the first page.

Although exemplary embodiments of systems and methods for tier management in memory-tiering environments have been specifically described and illustrated herein, many modifications and variations will be apparent to those skilled in the art. Accordingly, it is to be understood that systems and methods for tier management in memory-tiering environments constructed according to principles of this disclosure may be embodied other than as specifically described herein. The invention is also defined in the following claims, and equivalents thereof.

What is claimed is:

1. A method, comprising:
generating a first application process;
generating, based on the generating of the first application process, a first thread of the first application process;
accessing, by the first application process, a first page of the first application process in a first tier of a non-uniform memory access memory; and
locking, by the first thread of the first application process, the first page against demotion by an operating system, the first thread being a tier-management thread of the first application process, and
the locking of the first page being based on a service level of the first application process, wherein the service level determines a quantity of pages of the first application process to store in the first tier.

2. The method of claim 1, wherein the locking of the first page is further based on a first ranking of pages of the first application process, the first ranking of pages including the first page.

3. The method of claim 1, comprising locking a number of pages of the first application process including the first page, wherein the number of pages is based on the service level of the first application process.

4. The method of claim 3, wherein the number of pages is further based on a total number of pages of the first application process.

5. The method of claim 1, further comprising:
accessing, by the first application process, a second page of the first application process in the first tier of the non-uniform memory access memory; and
locking, by the first thread, the second page against demotion.

6. The method of claim 5, further comprising unlocking the first page, wherein the unlocking of the first page is based on the service level of the first application process.

7. The method of claim 6, wherein the unlocking of the first page is further based on a second ranking of pages of the first application process, the second ranking of pages including the first page and the second page.

8. The method of claim 7, wherein, in the second ranking, the second page is ranked higher than the first page.

9. The method of claim 1, wherein the first thread is dedicated to the first application process.

10. A system, comprising:
a processing circuit; and
memory, operatively connected to the processing circuit and storing instructions that, when executed by the processing circuit, cause the system to perform a method, the method comprising:
generating a first application process;
generating, based on the generating of the first application process, a first thread of the first application process;
accessing, by the first application process, a first page of the first application process in a first tier of a non-uniform memory access memory; and locking, by the first thread, the first page against demotion,
the first thread being a tier-management thread of the first application process, and
the locking of the first page being based on a service level of the first application process, wherein the service level determines a quantity of pages of the first application process to store in the first tier.

11. The system of claim 10, wherein the locking of the first page is further based on a first ranking of pages of the first application process, the first ranking of pages including the first page.

12. The system of claim 10, wherein the method comprises locking a number of pages of the first application process including the first page, wherein the number of pages is based on the service level of the first application process.

13. The system of claim 12, wherein the number of pages is further based on a total number of pages of the first application process.

14. The system of claim 10, wherein the method further comprises:
accessing, by the first application process, a second page of the first application process in the first tier of the non-uniform memory access memory; and
locking, by the first thread, the second page against demotion.

15. The system of claim 14, wherein the method further comprises unlocking the first page, wherein the unlocking of the first page is based on the service level of the first application process.

16. The system of claim 15, wherein the unlocking of the first page is further based on a second ranking of pages of the first application process, the second ranking of pages including the first page and the second page.

17. The system of claim 16, wherein, in the second ranking, the second page is ranked higher than the first page.

18. The system of claim 10, wherein the first thread is dedicated to the first application process.

19. A system, comprising:
means for processing; and
memory operatively connected to the means for processing, wherein the memory stores instructions that, when executed by the means for processing, cause the system to perform a method, the method comprising:
generating a first application process;
generating, based on generating the first application process, a first thread of the first application process;
accessing, by the first application process, a first page of the first application process in a first tier of a non-uniform memory access memory; and
locking, by the first thread, the first page against demotion by an operating system,
the first thread being a tier-management thread of the first application process, and
the locking of the first page being based on a service level associated with the first application process, wherein the service level determines a quantity of pages of the first application process to store in the first tier.

20. The system of claim 19, wherein the locking of the first page is further based on a first ranking of pages of the first application process, the first ranking of pages including the first page.

* * * * *